(12) United States Patent
Wright

(10) Patent No.: US 9,241,475 B2
(45) Date of Patent: Jan. 26, 2016

(54) HYDRAULIC BALE DISTRIBUTION SYSTEM

(71) Applicant: Trav-Call, Ltd., Lost Springs, WY (US)

(72) Inventor: Nyle Wright, Lost Springs, WY (US)

(73) Assignee: Trav-Call, Ltd., Lost Springs, WY (US)

( * ) Notice: Subject to any disclaimer, the term of this patent is extended or adjusted under 35 U.S.C. 154(b) by 0 days.

(21) Appl. No.: 14/215,878

(22) Filed: Mar. 17, 2014

(65) Prior Publication Data

US 2014/0271046 A1 Sep. 18, 2014

Related U.S. Application Data

(60) Provisional application No. 61/790,660, filed on Mar. 15, 2013.

(51) Int. Cl.
*A01D 85/00* (2006.01)
*A01K 5/00* (2006.01)

(52) U.S. Cl.
CPC ...................................... *A01K 5/005* (2013.01)

(58) Field of Classification Search
CPC .......... A01K 5/001; A01K 5/005; B60P 3/00; B65G 67/04; B65G 67/24
USPC ........ 414/25, 111, 789.7, 551, 493, 491, 539, 414/509
See application file for complete search history.

(56) References Cited

U.S. PATENT DOCUMENTS

| | | | |
|---|---|---|---|
| 2,397,046 A | 3/1946 | Richey | |
| 2,601,931 A * | 7/1952 | Dunham et al. | 414/516 |
| 2,616,578 A * | 11/1952 | Dunham | 414/516 |
| 2,671,570 A | 3/1954 | Richey | |
| 2,798,627 A | 7/1957 | Kucera | |
| 3,079,021 A | 2/1963 | Kohorst et al. | |
| 3,521,762 A * | 7/1970 | Walters | 414/789.4 |
| 3,656,638 A * | 4/1972 | Hutton et al. | 414/518 |
| 3,968,940 A | 7/1976 | Godbersen | |
| 3,985,246 A | 10/1976 | Seymour | |
| 4,068,804 A | 1/1978 | Butler et al. | |
| 4,300,867 A * | 11/1981 | Frees | 414/493 |
| 4,771,670 A * | 9/1988 | Woerman | 83/861 |
| 5,026,238 A | 6/1991 | Walt | |
| 5,813,616 A | 9/1998 | Vandervalk | |
| 5,997,233 A | 12/1999 | Whatley et al. | |
| 6,116,838 A | 9/2000 | Whatley et al. | |

(Continued)

FOREIGN PATENT DOCUMENTS

WO   WO 2007/068074   *   6/2007   ............. A01D 87/00

OTHER PUBLICATIONS

U.S. Appl. No. 61/790,660, filed Mar. 15, 2013; Entitled "Animal Feed Distribution System".

*Primary Examiner* — Saul Rodriguez
*Assistant Examiner* — Lynn Schwenning
(74) *Attorney, Agent, or Firm* — Santangelo Law Offices, P.C.

(57) ABSTRACT

The inventive technology generally relates to the field of animal feed distribution systems. In particular, the inventive technology includes general as well as specific methods and apparatus for the loading and/or distribution of baled animal feed. The inventive technology may provide for a hydraulically-controlled bale feeding device that may be used to load, and laterally discharge bale "flakes" through a cantilevered hydraulic armature. The system may also utilized a hydraulic slicing arm to aid in the flaking process as well as be adaptable to lifting devices, such as a pallet head on a traditional tractor and/or steer-skid.

20 Claims, 10 Drawing Sheets

(56) References Cited

U.S. PATENT DOCUMENTS

| | | |
|---|---|---|
| 6,685,120 B2 | 2/2004 | Grellner |
| 6,764,274 B2 | 7/2004 | Maclay |
| 6,817,820 B2 | 11/2004 | Ackerman et al. |
| 6,945,385 B2 | 9/2005 | Ackerman et al. |
| 7,090,456 B2 | 8/2006 | Ost et al. |
| 7,121,783 B2 | 10/2006 | Maclay |
| 7,347,659 B2 | 3/2008 | Maclay |
| 7,621,709 B2 | 11/2009 | Heitz, Jr. |
| 7,721,984 B2 | 5/2010 | Bootsma et al. |
| 8,192,130 B2 | 6/2012 | Clark |
| 2003/0062433 A1 | 4/2003 | Hughes |
| 2004/0219000 A1* | 11/2004 | Ost et al. ............. 414/111 |
| 2009/0162169 A1* | 6/2009 | Kenna ............. 414/25 |
| 2011/0014022 A1* | 1/2011 | Shoemaker et al. ......... 414/469 |
| 2012/0020761 A1* | 1/2012 | Priepke ............. 414/482 |
| 2012/0045297 A1 | 2/2012 | Smith |

* cited by examiner

HYDRAULIC BALE DISTRIBUTION SYSTEM

This application claims the benefit of and priority to U.S. Provisional Application No. 61/790,660, filed on Mar. 15, 2013. The entire specification and figures of the above-mentioned application is hereby incorporated, in its entirety by reference.

TECHNICAL FIELD

The inventive technology generally relates to the field of animal feed distribution systems. In particular, the inventive technology includes general as well as specific methods and apparatus for the loading and/or distribution of animal feed. In a preferred embodiment, the inventive technology may provide for a hydraulically-controlled bale feeding device that may be used to load, and sequentially discharge bale "flakes" for feeding in a field, hay manger or corral bunk. The system may also be adapted to, for example, a tractor, a conventional truck, a truck bed or a skid-steer.

BACKGROUND

The use of bales may be an efficient and effective way to collect and store certain kinds of materials that otherwise may exist in a loosely gathered form. In agriculture, for example, bales may be a widely used method for collecting and storing grasses and other components such as hay, alfalfa and the like. Generally speaking, such bales may be formed by compressing the collected components into bundles, and then tying down or wrapping the bundles as bales to maintain the collected components in a compressed state. Such bales may be a variety of sizes, however a square 3'×3'×7' bale may be typically. Moreover, a bale may contain variably sized "flakes" or portions that may be defined by sheer fault lines that more easily break and separate in response to an applied force. In many instances such bales may be broken up to be used for the feeding of animals. For example, a bale may broken off, or "flaked" into multiple portions, with each individual "flake" being distributed, for example, throughout a field.

In many applications which are known in the art, the end result is not to flake, but shred the bale during distribution. However, especially in the case of livestock feeding it is desirable to have larger chunks of hay pulled off of the bale in a relatively gentle manner. Thus, fewer small pieces of hay, which tend to get ground into the soil or fall out of the bottom of a feeding apparatus, rather than being consumed by an animal, may be avoided.

While the effort to form and flake individual bales is significant, additional time and labor may be required to handle and process the individual bales in order to put them to a more productive use. For example, individual bales may be formed in a field environment directly from cut grass. This may result in numerous individual bales sporadically located throughout a field. To put these individual bales to a productive use, however, it may be required to collect them and store them at a centralized location, and then transport them to a desired location to be flaked and distributed, for example, so as to provide feed for livestock. The effort required to collect and distribute such individual bale flakes may entail an inefficiency capable of improvement.

Various attempts have been made to produce a baler capable of providing the desired "flaking" capabilities described above, however, each has fallen short for a number of reasons. Most principally, many balers known in the art, such as Griller (U.S. Pat. No. 6,685,120), Hughes (2003/0062433) and/or Maclay (U.S. Pat. No. 6,764,274), all of which are incorporated by reference herein in their entirety, all utilize large and complex balers with multiple moving elements that are each susceptible to mechanical failure. As the number of elements and steps in such processes increase, there may be an increased risk of failure for any given step, perhaps adversely impacting the reliability of such baler. In addition, such systems are generally large and cumbersome, and may not be easily adapted to a variety of transports, such as a tractor, front end-loader, truck and/or skid-steer as some examples.

The foregoing problems regarding baling and feed distribution systems and processes may represent a long-felt need for a simple and effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

SUMMARY OF THE INVENTION

The current invention may include apparatus and methods for a bale feeder system that may include a hydraulically controlled bale feeding device, perhaps mounted to a tractor loader. In one embodiment, the invention may include a hydraulically controlled mechanical device mounted to a tractor loader, with a cantilevered push arm which may push, for example, loaded bales of hay laterally off of a platform with the bale feeder attachment. The tractor loader operator may collect and distribute bales from the tractor seat, using a quick-connect coupled to the tractor's hydraulic system port and controller. The invention may use this cantilevered arm design, like a backhoe arm, to achieve the lateral distance span of the two arms operating in unison to move a bale laterally across a feeder platform. Repeated advancement of the hydraulic arm by the operator pushes off bale flakes as desired until the push arm is fully retracted.

The invention may further use a hydraulic supply and a hydraulic control from a tractor or other vehicle, or its own independent source to activate the push arm for extension and retraction. The push arm may be connected to the frame of the tractor loader and structurally supported by a tractor loader pallet fork head and may use a horizontal scissor action controlled by the hydraulics of the tractor.

Additional embodiments of the current invention may include a hydraulically controlled slicer arm that may be coupled to a bale feeder and positioned so as to ally a downward pressure on the bale as it is traversed laterally across a bale feeder support platform towards a disbursement edge. This hydraulic slicer arm may be coupled to, for example a tractor hydraulic system similar to the cantilevered arm described above. This hydraulic control may include a toggle switch that may alternate between a hydraulic circuit from one hydraulic action to another. Additional embodiments may include various methods and apparatus to extend the bale feeder body to fit larger bales or perhaps a plurality of bales.

Naturally, additional embodiments may be contemplated that achieve various objections discussed and demonstrated herein.

DETAILED DESCRIPTION OF THE INVENTION

The present inventive technology includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

A preferred embodiment may include an apparatus for a bale feeder in various embodiments may be disclosed. In one embodiment, one or more bales may be collected and positioned on a feeder platform, and then laterally displaced, perhaps by a hydraulic scissor arm off a feeder platform such that the corresponding flakes/wafers of the bale may no longer be supported by the feeder platform and may tend to break off from the rest of the bale. In this manner, the current invention may be used to laterally discharge bale flakes off to the side of an exemplary unit for feeding in the field, hay mangers or corral bunks. In another embodiment, the bale feeder may be coupled with, and/or supported by a tractor loader pallet fork head. In addition, the hydraulic components disclosed herein may, for example control the extension and retraction of a hydraulic cylinder, be quick-connect coupled to the operator's selected tractor hydraulic system port and controller. As such, an operator of a tractor loader may progressively retrieve, transport and distribute bales from a single position.

Figure 1:
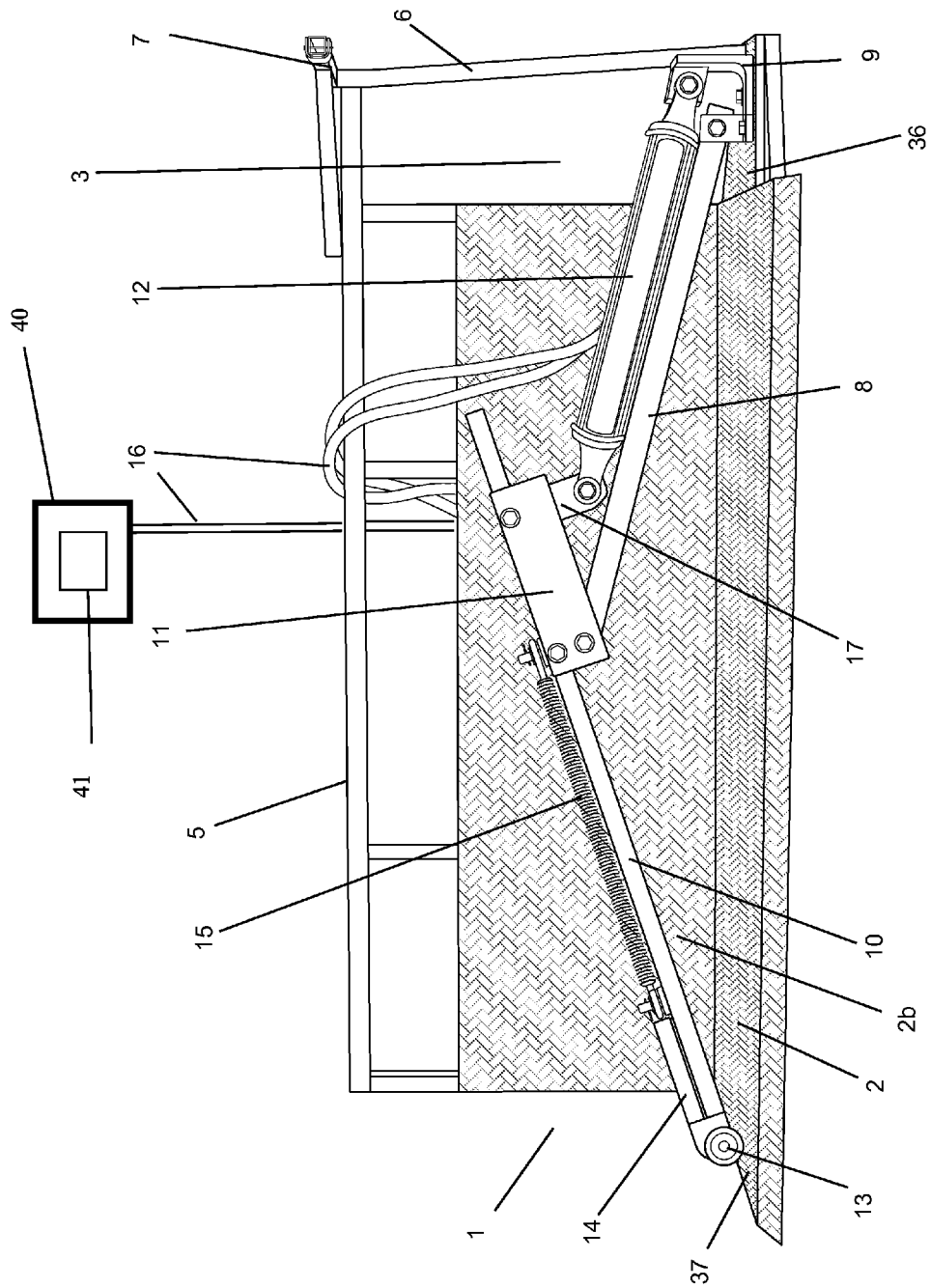
FIG. 1: is a front view of a bale feeder having a hydraulically controlled cantilevered push-arm in one embodiment thereof.
Figure 2:
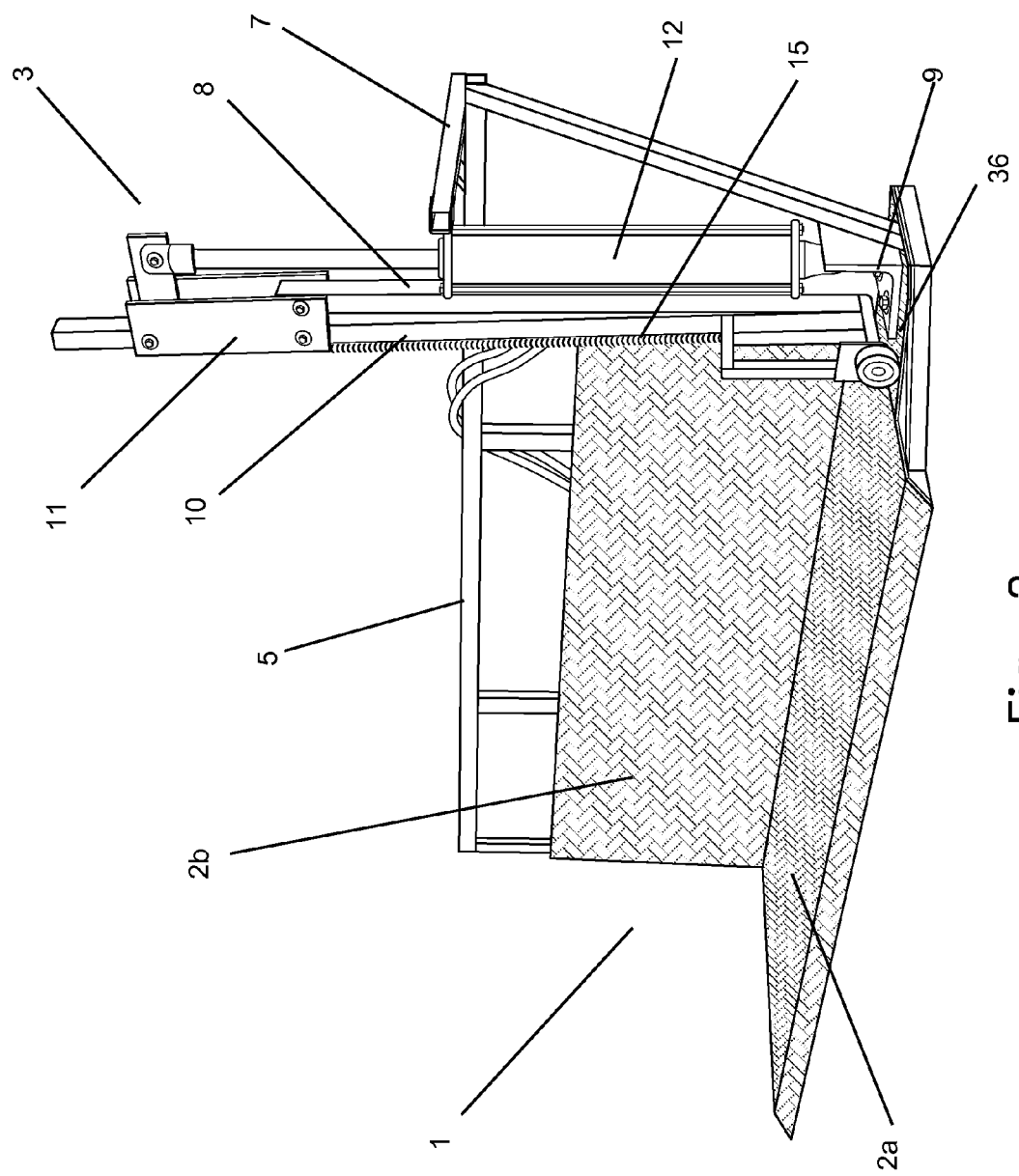
FIG. 2: is a perspective view of a bale feeder having a hydraulically controlled cantilevered push-arm in one embodiment thereof.

Specifically, as shown in FIGS. 1-2, in one embodiment the invention may include a bale feeder body (1). In this preferred embodiment a bale feeder body (1) may include, a bale feeder support platform (2a) supported by perhaps a frame support base element (4) forming a planar loading surface for an associated bale. This bale feeder support platform (2a) may have a beveled edge to aid in securing a bale into the bale feeder body (1). This surface element may be coupled with a backplane support frame (5) or backplane through a brace element (6) providing an approximately vertical supporting surface for a loaded bale. Moreover, as detailed in FIGS. 1 and 2, a restricting arm (7) may be secured to the top of a backplane support frame (5) providing a mechanical stop position as will be discussed below.

Again referring to FIGS. 1-2, a bale feeder may include hydraulic dispersing mechanism (3). In one preferred embodiment, a hydraulic base support (36) may be secured to, for example, a support base element (4) such that it may support a push arm action support bar (8). This push arm action support bar (8) may further be joined with this hydraulic base support (36) through a push arm action support bar pivot bracket (9) with a pivot bolt allowing rotational movement of the push arm action support bar (8) in response to, in this instance a hydraulic force. This push arm action support bar (8) may be adjustably coupled with a push arm (10) in a staggered fashion through a push arm coupler (11) as well as a push arm hydraulic actuator (12) through a pivot coupler (17). Again, this coupling may be through a pivot bolt forming a levered arm responsive to the action of a hydraulic actuator. Additionally, as shown in FIG. 1, the invention may include a push arm action support bar (8) which may be supported on a bale feeder support platform (2a) by one or more slide elements (13) such as roller wheels and may further be coupled with a bale push plate that may further be spring actuated in some embodiments.

Generally referring to FIG. 2, in one embodiment, a typical bale may be loaded onto a bale feeder body (1). As can be seen from the figures, in a general embodiment this may be accomplished by positioning a bale feeder support platform (2a), perhaps with an inclined leading beveled edge adjacent to a bale and moving, for example a tractor forwarded, loading the stationary bale onto the platform. In another preferred embodiment, a bale may be loaded onto a bale feeder body (1) by an operator by maneuvering a tractor loader hydraulic control (not shown) to adjust the height and angle of pallet fork/bale feeder complement to intercept the bottom plane of a bale at, for example approximately a 0° to 10° down angle. (It should be noted that a variety of angles are contemplated, and should not be seen as limiting.) The tractor may be advanced forward until the bale is perhaps elevated onto the feeder platform incline and onto the feeder platform surface at which time the operator may adjust the angle back to approximately 0° or level. Next, the tractor may advance forward until the bale is positioned on the bale feeder support platform (2a). Once positioned, an operator may hydraulically tilt the bale feeder body (1) to the rear causing a bale to slide backward to rest adjacent to a bale feeder backplane platform (2b). Once positioned along this feeder backplane platform (2b) the bale, or even plurality of bales, may then be transported to a distribution location.

In a preferred embodiment, a bale positioned along to a bale feeder backplane platform (2b) may be transported to a distribution location, where the bale twines may be cut and removed. The operator may activate a hydraulic control (not shown) coordinated with the tractor to supply pressure causing a push arm hydraulic actuator (12) to retract. As the hydraulic actuator retracts, force may be applied to a push arm (10), which in this case may include a pivot coupler (17) secured to a push arm coupler (11). This push arm (10) may move horizontally bringing a bale push plate (14) into contact with the bale. This engagement action of the bale push plate (14) and the force generated by push arm (10) may cause an upward lift force as well as horizontal or lateral movement of the bale across a bale feeder support platform (2a) to a disbursement edge (37). The operator may control the duration and timing of the push arm movement for a desired bale distribution spacing as well as the size of bale flakes to be disbursed. For example, a stronger force and shorter movement duration may produce a larger flake to be diapered and vice versa. As a bale is extended past the disbursement edge (37) of the bale feeder support platform (2a) an individual, or even a plurality of flakes may separate from the bale as result of flake "tilting" generated by gravity acting on the unsupported bale portion extended beyond the dispersing edge.

After the operator has distributed the bale the hydraulic control may activate a cylinder action to extend the actuator stroke. The cylinder may apply a force on the push arm (10). This force may be transmitted to a slide element (13) such as roller wheels coupled on the bale push plate (14) causing it to return to a horizontal position. During this return phase, the push arm (10) may contact a restricting arm (7) stopping the cylinder motion such that it may and be positioned in to "stored" vertical configuration. This cycle may be repeated by the operator as desired.

Figure 3:
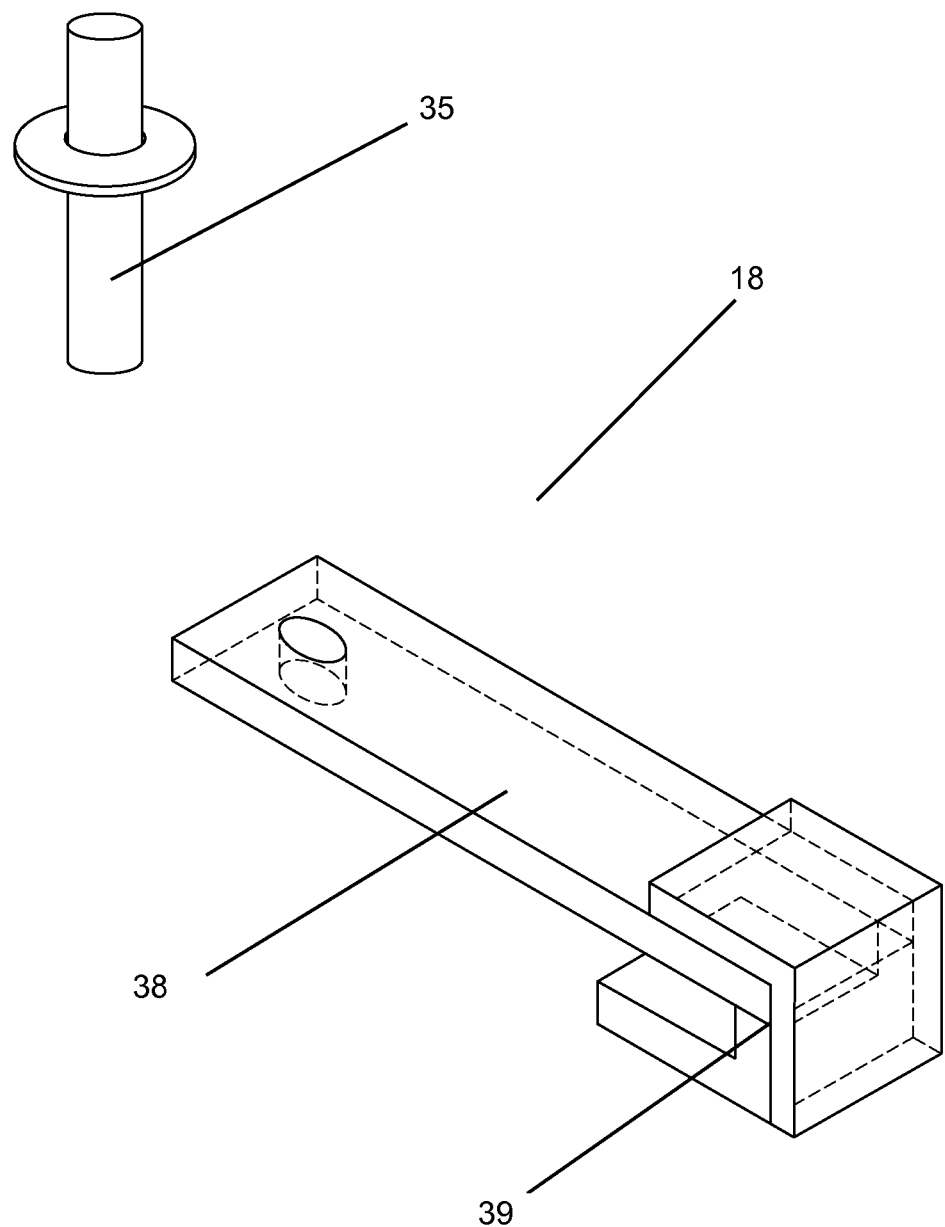
FIG. 3: are individual views of a bale feeder lift securing bar and latch pin in one embodiment thereof.
Figure 4:
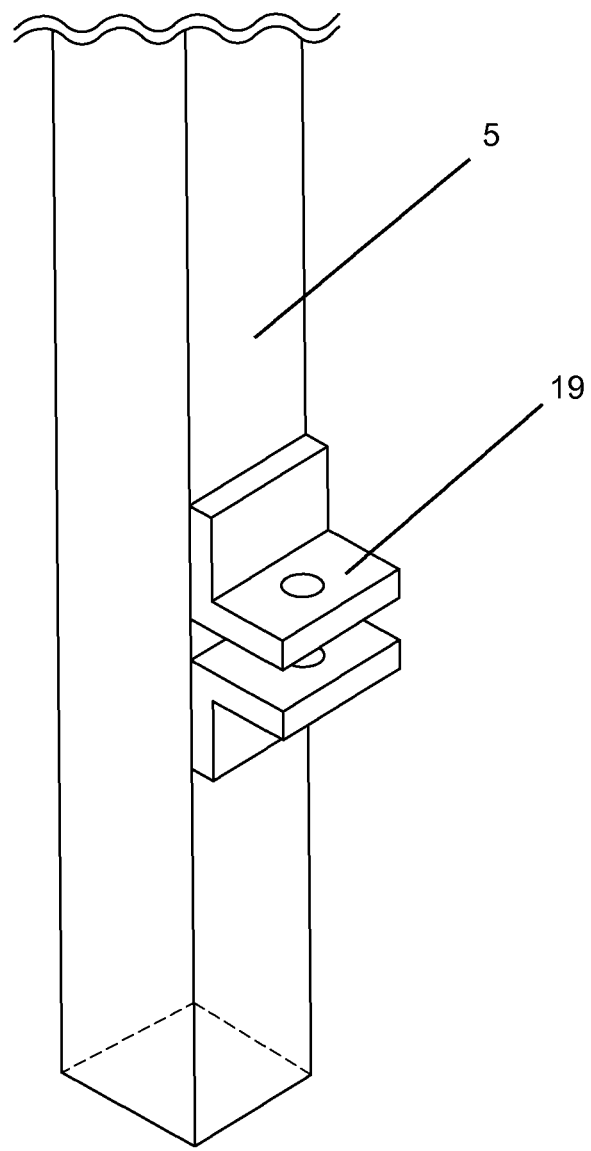
FIG. 4: shows a bale feeder lift attachment bracket coupled to a backplane support frame in one embodiment thereof.
Figure 5:
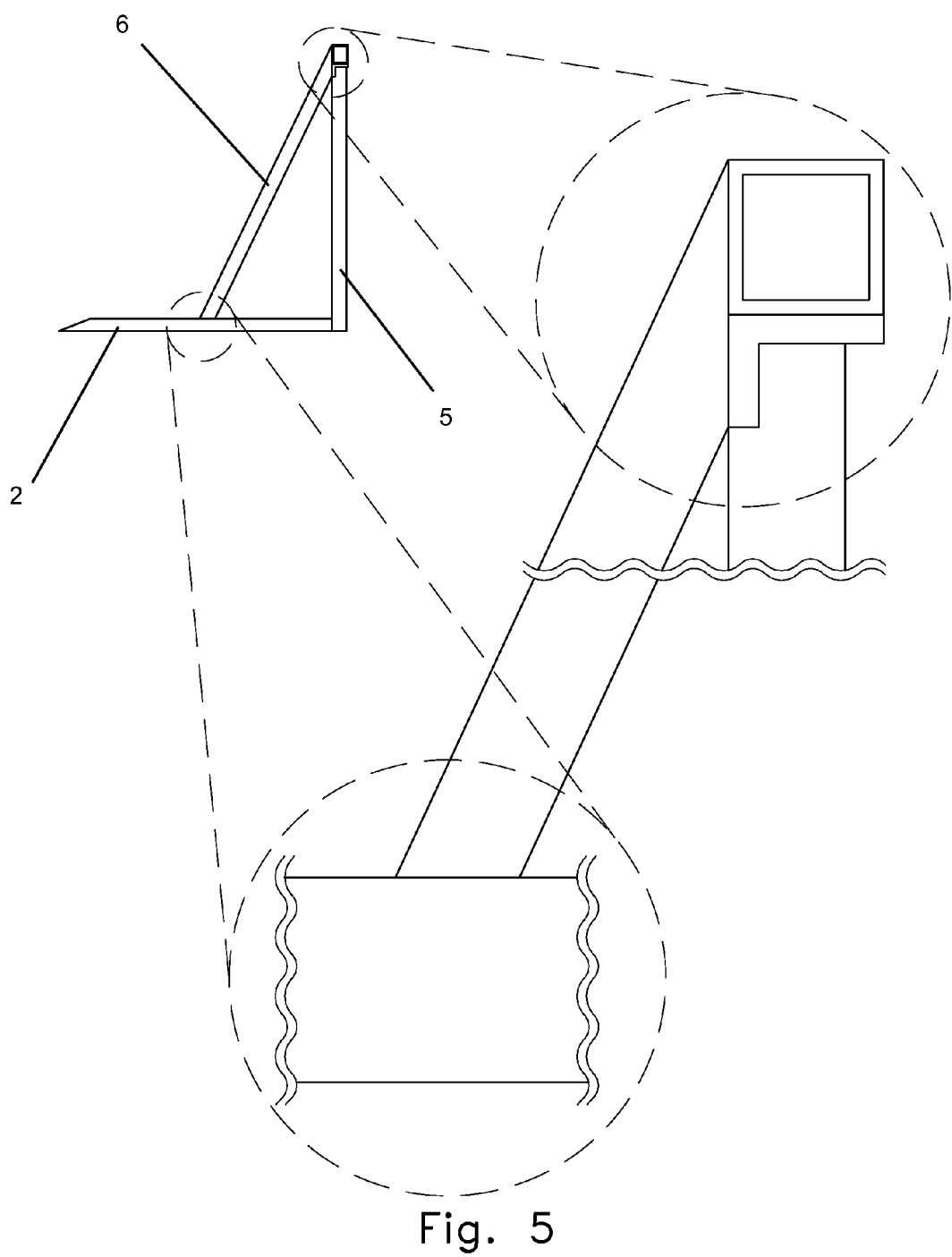
FIG. 5: shows a top and blow-out views of a brace element coupled with a restricting arm in one embodiment thereof.
Figure 6:
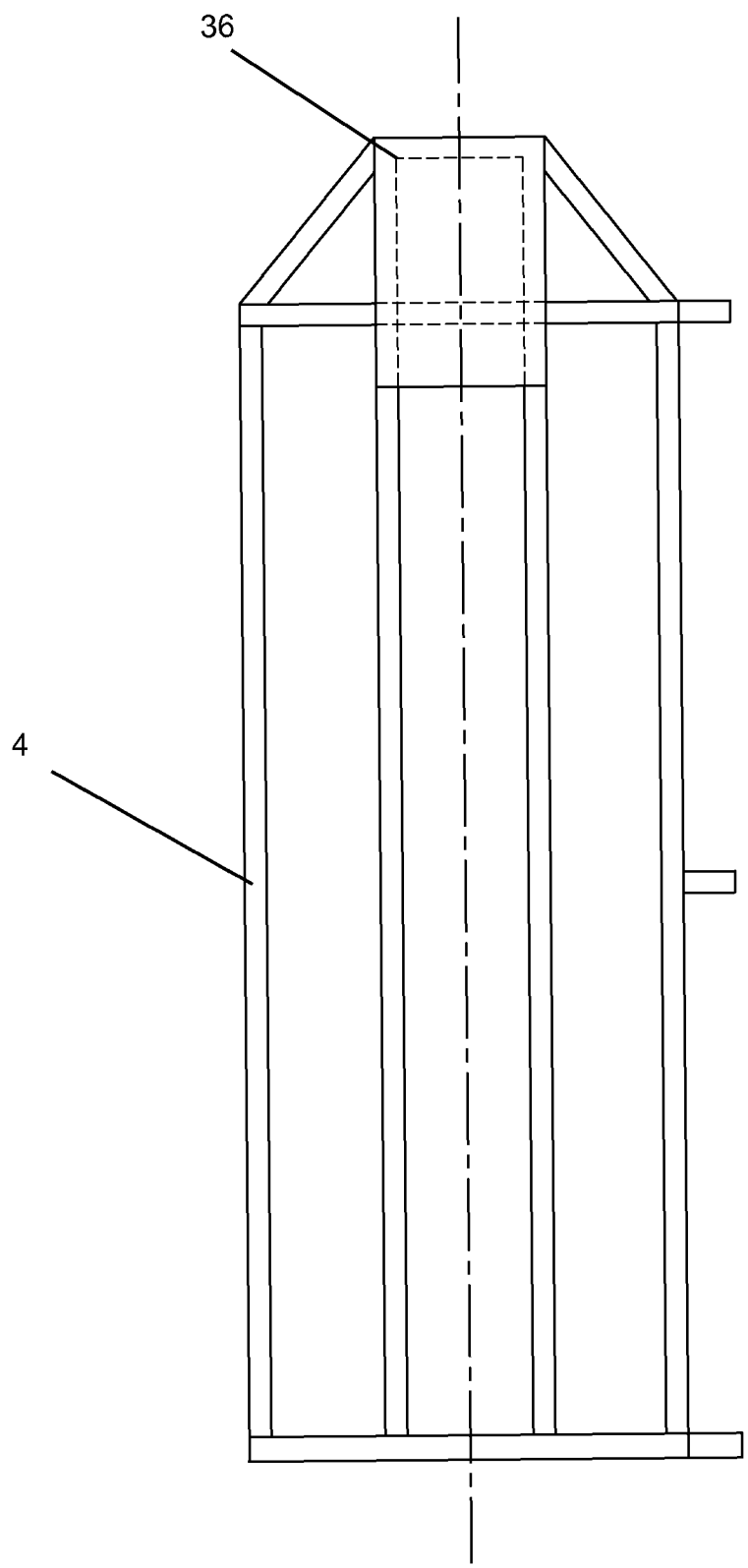
FIG. 6: is an isolated view of a support base element having a hydraulic base support in one embodiment thereof.
Figure 7:
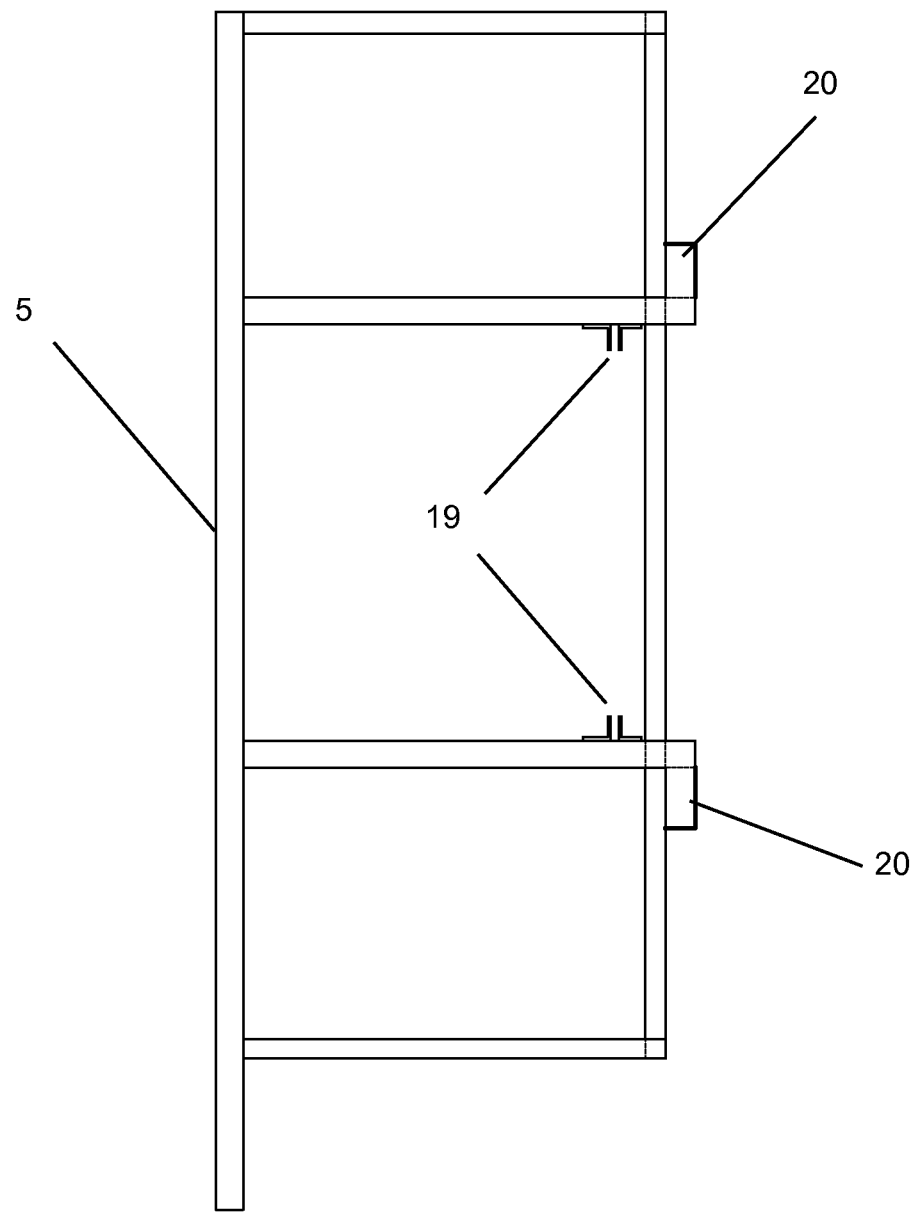
FIG. 7: shows a plurality of bale feeder lift attachment brackets and pallet fork guide bracket coupled to a backplane support frame in one embodiment thereof.

Referring now specifically to FIGS. 3-4 and 7, one of the many inventive features of the current system may include methods and apparatus for the attachment of the bale feeder body (1) to a variety of vehicles. In a preferred embodiment, for example the bale feeder body (1) may include one or more bale feeder lift attachment elements that may act as couplers to such vehicles. In one embodiment a pallet fork head may be secured to a bale feeder backplane platform (2b) by at least one bale feeder lift securing bar (18). This securing bar may be coupled to a bale feeder lift attachment bracket (19) secured to a bale feeder backplane platform (2b) with latch pin (35). This bale feeder lift attachment bracket (19) may be fitted with a securing bar (38) coupled with an attachment casing (39) which may allow the secure coupling of the bale feeder backplane platform (2b) with a bale feeder lift, such as a pallet fork head on a tractor or skid steer. Such embodiment may also allow the bale feeder lift securing bar (18) to be quickly and easily de-coupled respectively by removing the latch pin(s) (35) and securing bar (38).

As shown specifically in FIG. 7, in one embodiment, one or more bale feeder lift attachment brackets (19) may be secured to a bale feeder backplane platform (2b) or other supported structure. In a preferred embodiment, the inventive technology may have one or more pallet fork guide brackets (20) coupled to the bale feeder body (1), such as the bale feeder support platform (2a) such that one or more pallet fork tines may be inserted and/or secured inside. This securement system may allow for the bale feeder body (1) to be adjustably secured with a bale feeder lift, such as a pallet fork head on a tractor or skid steer. In some embodiments one or more support frame and/or other elements may be coupled with a pair of pallet fork guide bracket (20) which may guide and/or secure a pallet fork tine supporting the bale feeder body (1). Such pallet tines may be attached to a bale feeder with latch pins and a pivot bolt. Additional securing elements may be included at various other positions, for example, along the top lateral edge of a backplane, a frame, and/or any other suitable other element.

Figure 8:
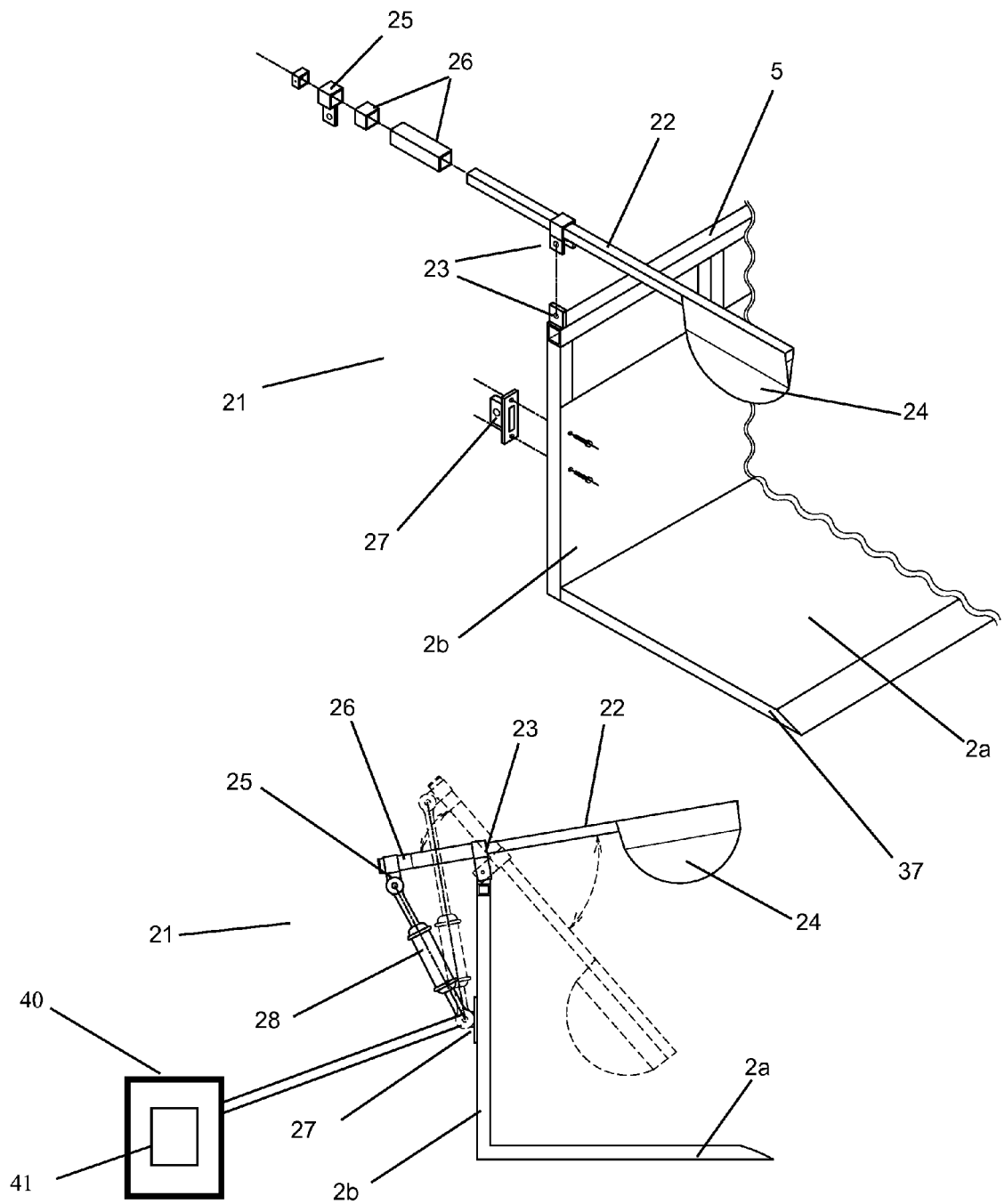
FIG. 8: is a side and perspective view of a slicer arm in one embodiment thereof.

As shown in FIG. 8, in one preferred embodiment, a bale slicing assembly (21) may be utilized to assist in the efficient flaking of a bale. As noted above, as a bale is extended past the disbursement edge (37) of the bale feeder support platform (2a) an individual, or even a plurality of flakes may separate from the bale as result of flake "tilting" generated by gravity acting on the unsupported bale portion extended beyond the dispersing edge. However, in some instances, perhaps due to moisture or the composition of the baled material a bale may not easily flake. In this instance, this type of gravity flaking may be augmented through the use of a bale slicing assembly (21). Again, as demonstrated in FIG. 8, a bale slicing arm (22) having a bale cut plate (24) may be secured to a bale feeder body (1). In a preferred embodiment, this bale slicing arm (22) may be secured to a backplane support frame (5) by a slicer arm pivot bracket (23) such that the bale slicing arm (22) may levered up and down. Various spacers (26) may be coupled to the bale slicing arm (22) to adjust the length of the armature altering the lever characteristics as well as to perhaps accommodate various sized bales.

Again referring to FIG. 8, a slicer arm hydraulic actuator (28) may be fixed to a bale feeder body (1) and further attached to the proximal end of a bale slicing arm (22), perhaps through a hydraulic support pivot bracket (27). In a preferred embodiment, this slicer arm hydraulic actuator (28) may be secured to bale feeder backplane platform (2b) and may further be responsive to a hydraulic controller (40). This hydraulic controller (40) may originate from an associated tractor or steer-skid.

As noted above, in one embodiment a hydraulic controller toggle switch (41) may be established to allow a user to alternatively innervate a slicer arm hydraulic actuator (28) and/or push arm hydraulic actuator (12) circuits. For example, in a preferred embodiment an operator may toggle to a first circuit innervating a push arm hydraulic actuator (12). This innervation may cause retraction of said hydraulic actuator (12) causing a push arm (10) to traverse a bale laterally across the bale feeder support platform (2a) towards a disbursement edge. After a desired portion of the bale is extended past the disbursement edge (37) of the bale feeder support platform (2a) an operator may toggle said hydraulic control to a second circuit to innervate a slicer arm hydraulic actuator (28). This innervation may cause extension of said hydraulic actuator allowing said bale slicing arm (22) to pivot downward applying pressure on the bale causing the desired flaking to more easily occur. This innervation may be removed and/or reversed causing retraction of the slicer arm hydraulic actuator (28) causing the bale slicing arm (22) to pivot back upward. Now, an operator may toggle back to a first hydraulic circuit and innervate the push arm hydraulic actuator (12) to continue the lateral advancement of the bale. Naturally this sequence may be repeated until the bale has been fully distributed from the bale feeder body (1). In other embodiments this bale slicing arm (22) may be left in a down position and act as a restriction bar for a bale secured within a bale feeder body (1).

Figure 9:
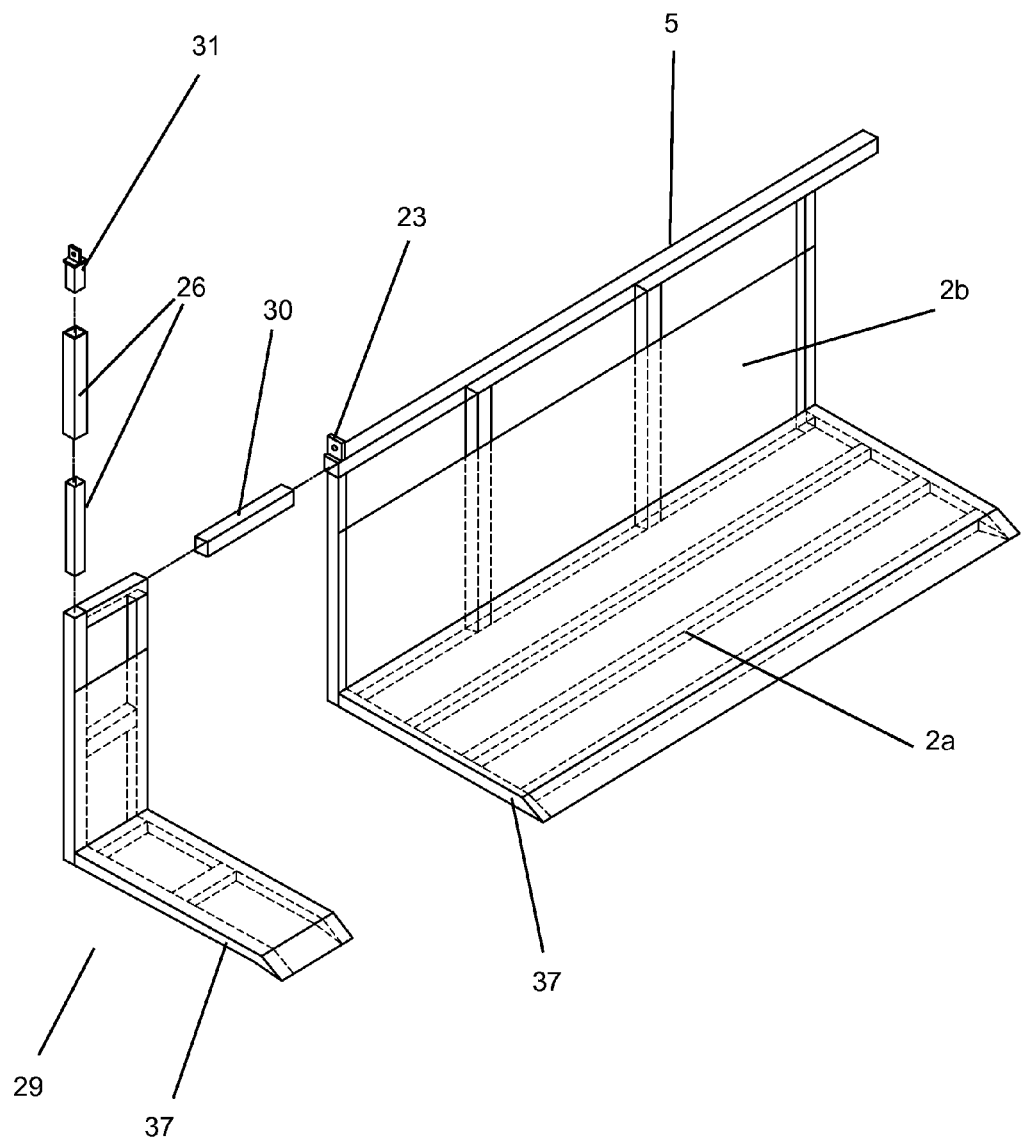
FIG. 9: is a bale feeder support platform extension in one embodiment thereof.
Figure 10:
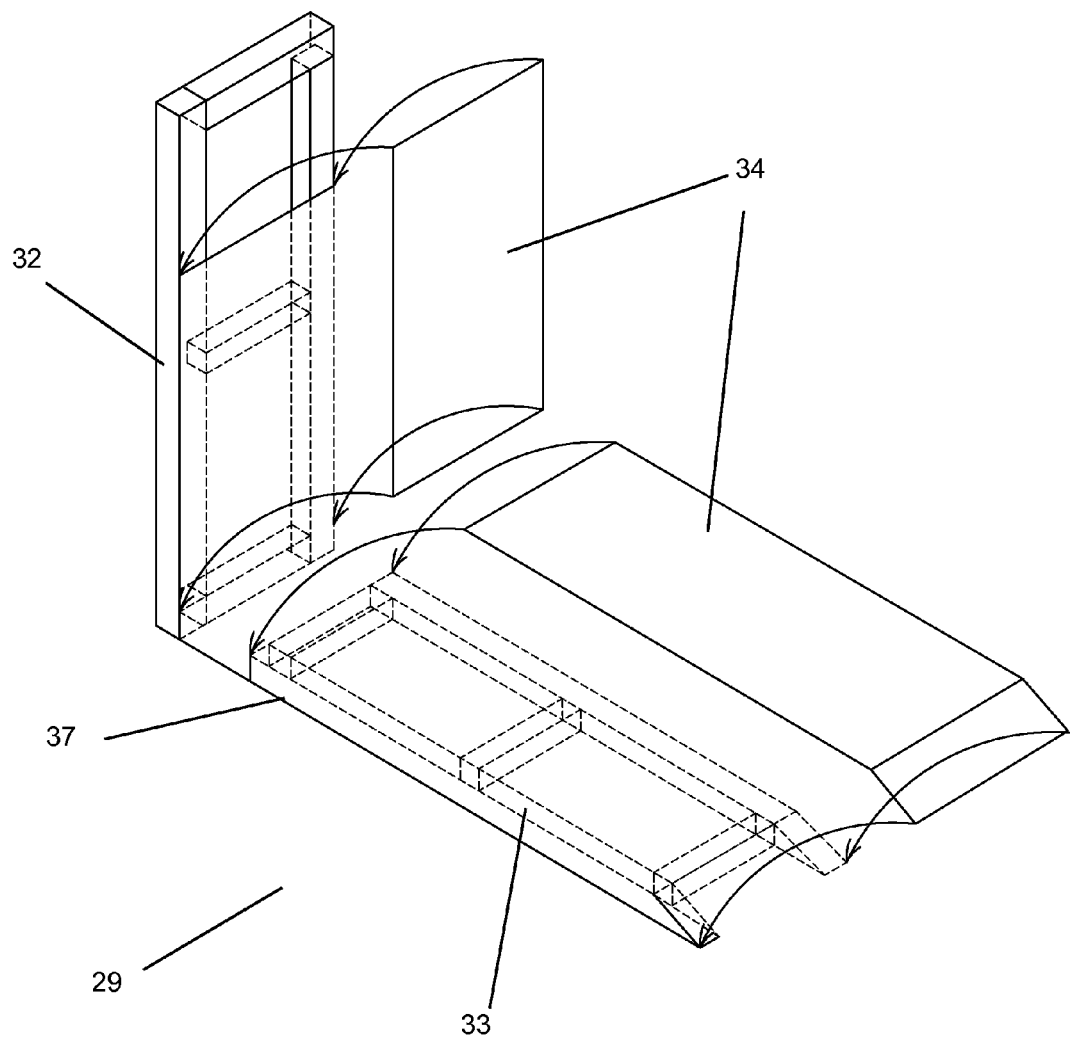
FIG. 10: is a broken out view of bale feeder support platform extension with variable extension plates in one embodiment thereof.

In yet another embodiment, as shown in FIGS. 9-10, a bale feeder support platform extension (29) may be coupled to a bale feeder body (1) so as to accommodate one or more bales of variable sizes. In a preferred embodiment, variable bale feeder support backplane extension (32) may be secured to a backplane support frame (5). Such coupling may include inserting a variably sized bale feeder support backplane extension (32) into the aperture of a hollow backplane support frame (5). As shown in FIG. 9, this bale feeder support backplane extension (32) may further be secured to a variable bale feeder support base extension (33) secured to a variable bale feeder support base extension (33). This variable bale feeder support extensions may be a unitary element as well. In addition, the variable bale feeder support base extension (33) may also have a disbursement edge (37) while both bale feeder support extensions may be covered in by variable extension plate (34) so as to provide a traversing surface for one or more bales. Naturally, each variable element may be customized according to a specific desired dimension.

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, techniques as well as devices to accomplish providing methods and apparatus for a hydraulic feed/bale distribution system and the like. In this application, the improved hydraulic feed/bale distribution techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system for providing for the hydraulic distribution of bales the like. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in method-oriented terminology, each element of the claims corresponds to a device. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupling method and/or technique, and or device" and even a "means for coupling." Such changes and alternative terms are to be understood to be explicitly included in the description.

Any patents, publications, or other references mentioned in this application for patent, such as in the specification or an IDS are hereby incorporated herein by reference in their entirety. Any priority case(s) claimed by this application is hereby appended and hereby incorporated herein by reference in their entirety. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated herein by reference in their entirety. Finally, all references listed in the list of References To Be Incorporated By Reference In Accordance With The Patent Application or other information disclosure statement and the like filed with the application are hereby appended and hereby incorporated herein by reference in their entirety, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the system (with corresponding methods and apparatus) of providing methods and/or apparatus for the hydraulic distribution of feed and/or bales as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

In addition and as to automated and/or computer aspects and each aspect amenable to programming or other electronic automation, the applicant(s) should be understood to have support to claim and make a statement of invention to at least: xvi) processes performed with the aid of or on a computer and or controller as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this application also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

What is claimed is:

1. A bale feeder comprising:
   at least one bale feeder body configured to support at least one bale comprising:
      a support base element supporting a bale feeder support platform; and
      a backplane support frame supporting a bale feeder backplane platform;
   at least one hydraulic dispersing mechanism coupled to said bale feeder body comprising:
      at least one push arm action support bar secured to said bale feeder body through a pivot bracket mounted on a hydraulic base support;
      at least one push arm hydraulic actuator secured to said bale feeder body through a pivot bracket mounted on a hydraulic base support; and
      at least one push arm coupled with said push arm action support bar and said hydraulic actuator through a push arm coupler such that in response to retraction of said hydraulic actuator said push arm may traverse laterally across said bale feeder support platform towards a disbursement edge;
   at least one slide element coupled with said push arm;
   at least one bale push plate coupled to the distal end of said push arm;
   at least one brace element coupled with said hydraulic base support;
   at least one restricting arm secured to said backplane support frame and said brace element;
   at least one bale feeder lift securing bar comprising:
      at least one securing bar secured to at least one attachment casing coupled to a bale feeder lift element;
      at least one bale feeder lift attachment bracket secured to said backplane support frame and secured by said securing bar with a latch pin locking said bale feeder lift element to said bale feeder body; and
      at least one pallet fork guide bracket secured to said support base element;
   at least one bale slicing assembly comprising:
      at least one bale slicing arm having at least one bale cut plate coupled with a slicer arm pivot bracket secured to said bale feeder backplane platform; and
      at least one slicer arm hydraulic actuator secured to said backplane support frame and coupled with said bale slicing arm through a slicer arm hydraulic pivot bracket such that extension of said hydraulic actuator allows said slicer arm to pivot downward;
   a hydraulic controller responsive to said push arm hydraulic actuator and slicer arm hydraulic actuator.

2. A hydraulic bale feed distributor comprising:
   at least one bale feeder body configured to support at least one bale having a bale feeder support platform and a bale feeder backplane platform;
   at least one hydraulic dispersing mechanism coupled to said bale feeder body comprising:
      at least one push arm action support bar secured to said bale feeder body;
      at least one push arm hydraulic actuator secured to said bale feeder body; and
      at least one push arm coupled with said push arm action support bar and said hydraulic actuator such that in response to the action of said hydraulic actuator said push arm may traverse laterally across said bale feeder support platform towards a disbursement edge;
   at least one bale slicing arm having at least one bale cut plate coupled with a slicer arm pivot bracket secured to said bale feeder backplane platform;
   at least one slicer arm hydraulic actuator secured to said backplane support frame and coupled with said bale slicing arm through a slicer arm hydraulic pivot bracket such that extension of said hydraulic actuator allows said slicer arm to pivot downward; and
   a hydraulic controller responsive to said slicer arm hydraulic actuator and said push arm hydraulic actuator.

3. A hydraulic bale feed distributor as described in claim 2 wherein said push arm action support bar secured to said bale feeder body comprises a push arm action support bar secured to said bale feeder body through a pivot bracket.

4. A hydraulic bale feed distributor as described in claim 2 wherein said push arm hydraulic actuator secured to said bale feeder body comprises a push arm hydraulic actuator secured to said bale feeder body through a pivot bracket.

5. A hydraulic bale feed distributor as described in claim 2 wherein said push arm coupled with said push arm action support bar and said hydraulic actuator comprises a push arm coupled with said push arm action support bar and said hydraulic actuator through a push arm coupler such that in response to retraction of said hydraulic actuator said push arm may traverse laterally across said bale feeder support platform towards a disbursement edge.

6. A hydraulic bale feed distributor as described in claim 2 further comprising at least one bale push plate coupled to said push arm.

7. A hydraulic bale feed distributor as described in claim 6 wherein said bale push plate coupled to said push arm comprises a bale push plate coupled said push arm.

8. A hydraulic bale feed distributor as described in claim 2 further comprising at least one brace element coupled with said hydraulic base support.

9. A hydraulic bale feed distributor as described in claim 2 further comprising at least one restricting arm.

10. A hydraulic bale feed distributor as described in claim 9 wherein said restricting arm comprises a restricting arm secured to said backplane support frame and said brace element.

11. A hydraulic bale feed distributor as described in claim 2 further comprising at least one slide element coupled with said push arm.

12. A hydraulic bale feed distributor as described in claim 11 wherein said slide element comprises at least one roller wheel coupled with said push arm.

13. A hydraulic bale feed distributor as described in claim 2 wherein said hydraulic controller comprises an internal loader hydraulic controller.

14. A hydraulic bale feed distributor as described in claim 13 wherein said internal loader hydraulic controller comprises a hydraulic controller toggle switch configured to be capable of alternatively innervating separate hydraulic actions.

15. A hydraulic bale feed distributor as described in claim 2 further comprising at least bale feeder support platform extension comprising:
   at least one variable extension connector secured to said backplane support frame;

at least one variable bale feeder support backplane extension secured to a variable extension plate; and slicer arm bale feeder support base extension secured to a variable extension plate.

16. A hydraulic bale feed distributor as described in claim 2 further comprising at least one bale feeder lift securing bar comprising:
   at least one securing bar secured to at least one attachment casing coupled to a bale feeder lift element; and
   at least one bale feeder lift attachment bracket secured to said backplane support frame and secured by said securing bar with a latch pin locking said bale feeder lift element to said bale feeder body.

17. A hydraulic bale feed distributor as described in claim 16 further comprising at least one pallet fork guide bracket secured to said support base element.

18. A hydraulic bale feed distributor as described in claim 16 wherein said bale feeder lift element comprises a bale feeder lift element selected from the group consisting of: a pallet fork head; tractor a pallet fork head; skid steer a pallet fork head; tractor a pallet hydraulic lift; skid steer hydraulic lift; front end loader; and a truck.

19. A hydraulic bale distribution system comprising:
   at least one bale feeder body configured to support at least one bale comprising:
      a support base element supporting a bale feeder support platform; and
      a backplane support frame supporting a bale feeder backplane platform;
   at least one hydraulic dispersing mechanism coupled to said bale feeder body comprising:
      at least one push arm action support bar secured to said bale feeder body through a pivot bracket mounted on a hydraulic base support;
      at least one push arm hydraulic actuator secured to said bale feeder body through a pivot bracket mounted on a hydraulic base support; and
      at least one push arm coupled with said push arm action support bar and said hydraulic actuator through a push arm coupler such that said push arm may traverse laterally across said bale feeder support platform towards a disbursement edge;
   at least one slide element coupled with said push arm;
   at least one bale push plate coupled to the distal end of said push arm;
   at least one brace element coupled with said hydraulic base support;
   at least one restricting arm secured to said backplane support frame and said brace element;
   at least one bale slicing assembly comprising:
      at least one bale slicing arm having at least one bale cut plate coupled with a slicer arm pivot bracket secured to said bale feeder backplane platform; and
      at least one slicer arm hydraulic actuator secured to said backplane support frame and coupled with said bale slicing arm through a slicer arm hydraulic pivot bracket such that extension of said hydraulic actuator allows said slicer arm to pivot downward;
   a hydraulic controller responsive to said push arm hydraulic actuator and slicer arm hydraulic actuator.

20. An adjustable hydraulic feeder system comprising
   at least one bale feeder body configured to support at least one bale comprising:
      a support base element supporting a bale feeder support platform; and
      a backplane support frame supporting a bale feeder backplane platform;
   at least one hydraulic dispersing mechanism coupled to said bale feeder body comprising:
      at least one push arm action support bar secured to said bale feeder body through a pivot bracket mounted on a hydraulic base support;
      at least one push arm hydraulic actuator secured to said bale feeder body through a pivot bracket mounted on a hydraulic base support; and
      at least one push arm coupled with said push arm action support bar and said hydraulic actuator through a push arm coupler such that said push arm may traverse laterally across said bale feeder support platform towards a disbursement edge;
   at least one securing bar secured to at least one attachment casing coupled to a bale feeder lift element;
   at least one bale feeder lift attachment bracket secured to said bale feeder body;
   at least one pallet fork guide bracket secured to said bale feeder body; and
   a hydraulic controller responsive to said push arm hydraulic actuator.

* * * * *